United States Patent [19]

Schilling et al.

[11] Patent Number: 5,786,405

[45] Date of Patent: Jul. 28, 1998

[54] AMINE-INITIATED POLYETHER POLYOLS AND A PROCESS FOR THEIR PRODUCTION

[75] Inventors: Steven L. Schilling, Glen Dale, W. Va.; Herman P. Doerge; Lotar H. Hanusa, both of Pittsburgh, Pa.

[73] Assignee: Bayer Corporation, Pittsburgh, Pa.

[21] Appl. No.: 742,548

[22] Filed: Nov. 1, 1996

[51] Int. Cl.⁶ .................. C08J 9/04; C08G 18/50; C07C 213/04; C07C 215/04

[52] U.S. Cl. ............ 521/167; 521/117; 521/130; 521/164; 564/399; 564/443; 564/445; 564/475; 564/504; 564/505

[58] Field of Search .................. 521/164, 167, 521/117, 130; 564/399, 443, 445, 475, 504, 505

[56] References Cited

U.S. PATENT DOCUMENTS

| | | | |
|---|---|---|---|
| 4,243,759 | 1/1981 | Haas | 521/167 |
| 4,391,728 | 7/1983 | Korczak et al. | 252/182 |
| 4,430,490 | 2/1984 | Doerge | 528/77 |
| 4,521,548 | 6/1985 | Christen et al. | 521/167 |
| 4,877,879 | 10/1989 | Gansow | 544/402 |
| 5,030,758 | 7/1991 | Dietrich et al. | 564/399 |
| 5,141,968 | 8/1992 | Dietrich et al. | 521/167 |
| 5,254,745 | 10/1993 | Jähme | 568/613 |

FOREIGN PATENT DOCUMENTS

| | | |
|---|---|---|
| 57-168917 | 10/1982 | Japan . |
| 57-168918 | 10/1982 | Japan . |

*Primary Examiner*—Rabon Sergent
*Attorney, Agent, or Firm*—Joseph C. Gil; Lyndanne M. Whalen

[57] ABSTRACT

Clear, amine-initiated polyether polyols are made by epoxidizing an amine in the presence of an alkali metal hydroxide catalyst. After the desired degree of epoxidation has been achieved, a hydroxy-carboxylic acid is added to the epoxidized mixture in an amount sufficient to neutralize any remaining alkali metal hydroxide. The polyols produced in this manner are particularly useful for the production of polyurethane and apolyisocyanurate foams.

13 Claims, No Drawings

AMINE-INITIATED POLYETHER POLYOLS AND A PROCESS FOR THEIR PRODUCTION

BACKGROUND OF THE INVENTION

The present invention relates to clear, amine-initiated polyether polyols, to a process for their production and to the use of those polyether polyols in the production of molded rigid foams.

Polyether polyols are known to be useful in the production of rigid polyurethane and polyurethane-polyisocyanurate foams. In one of the most common methods for the production of these polyols, a polyhydric alcohol such as sucrose is reacted with an alkylene oxide such as ethylene oxide or propylene oxide in the presence of an alkaline catalyst such as sodium hydroxide. Prior to use in the production of foams, any alkaline catalyst present in the polyol must be neutralized and/or removed to ensure that the catalyst will not interfere with the reaction between polyol and another reactive material such as a polyisocyanate. This is generally accomplished by addition of an acid to neutralize the alkaline catalyst. This neutralization frequently results in the precipitation of a solid salt in the polyol which salt may be removed by filtration. The removed solid is commonly called the filter cake.

U.S. Pat. No. 4,430,490 discloses a process for producing a polyether polyol from a polyhydric alcohol in which the alkaline catalyst is neutralized with a hydroxy-carboxylic acid which is soluble in the polyol. The use of this hydroxy-carboxylic acid to neutralize the alkaline catalyst makes it possible to obtain a clear polyol product which does need to be filtered before use and does not contribute to the generation of a filter cake requiring disposal. U.S. Pat. No. 4,430,490 is, however, limited to the production of polyether polyols from polyhydric alcohols such as sucrose.

U.S. Pat. No. 4,521,548 teaches that the alkaline catalyst used to produce the polyether polyols disclosed therein may be neutralized with formic acid. The benefit of neutralization with formic acid is also the solubility of the reaction product of the formic acid and alkaline catalyst in the product polyol.

However, as new blowing agents which will not deplete the ozone layer are developed for the production of rigid foams, it has been found that many of the known polyether polyols do not produce rigid foams having all of the desirable physical properties when a non-CFC (i.e., non-chlorofluorocarbon) blowing agent is used.

One type of polyether polyol which has demonstrated some promise in foam-forming systems blown with non-CFC blowing agents is an amine-initiated polyether polyol. Such polyether polyols may be formed by reacting an amine such as toluene diamine with an alkylene oxide such as ethylene oxide or propylene oxide. This reaction may also be catalyzed by an alkaline catalyst such as potassium hydroxide. Consequently, the problem of catalyst removal and generation of a large quantity of filter cake is also a problem encountered with the production of amine-initiated polyether polyols.

For example, Japanese Abstracts 57168917A and 57168918 each teach that the alkaline catalyst used in the production of the amine-initiated polyethers disclosed therein may be achieved by the addition of oxalic acid in quantities sufficient to neutralize the alkaline catalyst. Some of the oxalate salts formed, however, are insoluble in the product polyol. After the catalyst is neutralized by oxalic acid, the product must be degassified to obtain the polyether polyol.

U.S. Pat. No. 4,877,879 teaches that neutralization of the alkaline catalyst used in the production of the amine-initiated polyethers disclosed therein may be achieved by adding formic acid in a substantial (i.e., greater than 300%) stoichiometric excess with respect to the amount of alkaline catalyst to be neutralized. The formic acid not only produces a salt which is soluble in the product amine but also hydrogen which is taught to contribute to the stability of the polyether.

SUMMARY OF THE INVENTION

It is an object of the present invention to provide a clear, amine-initiated polyether polyol in which any residual alkaline catalyst from the polyol production process is neutralized.

It is also an object of the present invention to provide a process for the production of a clear, amine-initiated polyether polyol in which any residual alkaline catalyst is neutralized in a manner which does not generate large quantities of solid waste.

It is a further object of the present invention to provide amine-initiated polyether polyols which produce non-CFC blown foams that exhibit improved demold performance.

These and other objects which will be apparent to those skilled in the art are accomplished by epoxidizing an amine such as toluene diamine (TDA) in the presence of an alkaline catalyst. Upon completion of the epoxidation, a hydroxy carboxylic acid is added in an amount sufficient to neutralize any alkaline catalyst remaining. Also, the hydroxy carboxylic acid salt may not change the hydroxyl number of the product significantly and it is chemically incorporated into the polyurethane or polyisocyanurate foam.

DETAILED DESCRIPTION OF THE INVENTION

The present invention relates to clear, amine-initiated polyether polyols which are substantially free of residual alkaline catalyst. These polyether polyols contain salts of hydroxy-carboxylic acids which are soluble in the polyether polyol and which do not interfere with subsequent reactions of the polyol with other reactive materials.

The polyols of the present invention may be prepared by methods which are well known in the art. In general, the amine-initiated polyether polyols of the present invention are prepared by reacting an alkylene oxide with an amine having an amine functionality of at least 2 in the presence of an alkaline catalyst.

The amines useful in the practice of the present invention have an amine functionality of at least 1, preferably from about 1 to about 3, most preferably from 1 to 2. For example, a primary amine, $R-NH_2$ reacts with epoxides to give two hydroxyl groups. For example, $RNH_2$ can react with 2 moles of ethylene oxide to yield $HO-CH_2CH_2-NR-CH_2CH_2OH$. Therefore, an amine functionality of 1 in this case gives a polyol functionality of 2. Examples of suitable amines include, but are not limited to, aromatic amines such as crude toluene diamine obtained by the nitration of toluene followed by reduction, 2,3-toluene diamine, 3,4-toluene diamine, 2,4-toluene diamine, and 2,6-toluene diamine or mixtures thereof, aniline, 4,4'-methylene dianiline, methylene-bridged polyphenyl polyamines composed of isomers of methylene dianilines and triamines or polyamines of higher molecular weight prepared by reacting aniline with formaldehyde by methods known in the art, ammonia, alkanol amines such as monoethanol amine, diethanolamine, triethanolamine, organic amines such as methyl amine, ethylene diamine, diethylene triamine and the like, and Mannich reaction products of phenol or substituted phenols with alkanol amines and formaldehyde or paraformaldehyde. Mixture of the above amines may also be used.

Examples of alkylene oxides useful in producing the polyether polyols of the present invention include: ethylene oxide, propylene oxide, butylene oxide, and mixtures of these alkylene oxides. Combinations of ethylene oxide and propylene oxide are particularly preferred.

In principle, any alkaline material capable of catalyzing the epoxidation reaction of the present invention may be used. Specific alkaline catalysts which have been found to be particularly suitable include potassium hydroxide and sodium hydroxide.

In general, the epoxidation reaction occurs by contacting the amine having an amine functionality of at least 1 with the alkylene oxide(s) at an elevated temperature in the range of from 90° to 180° C. under moderately elevated pressure in the presence of the alkaline catalyst. The amounts of amine and alkylene oxide which are used are generally 1 to 10 equivalents of alkylene oxide for each equivalent of amine. The epoxidation product generally has an average hydroxyl value (determined by ASTM D-2849-69 hydroxyl number method C) of at least 225, preferably in the range of from about 250 to about 1200. The molecular weights of the polyether polyols of the present invention (number average determined by end group analysis and nominal functionality of the polyol) generally range from about 150 to about 1500, preferably from about 300 to about 1200, most preferably from about 400 to about 1000.

After the polyol has been prepared, the resultant reaction mixture which contains the alkaline catalyst in amounts of from about 0.1% to about 1.0% as KOH is neutralized with a hydroxy-arboxylic acid. Neutralization may be accomplished by mixing the hydroxy-carboxylic acid and reaction mixture at ambient conditions with stirring. Neutralization need not be exact neutrality (i.e., pH=7.0). The reaction mixture may be maintained at a slight acidity or alkalinity, i.e., at a pH of from 5 to 11, preferably, from 6 to 10. The neutralized catalyst must be soluble in the polyether polyol so that the product amine-initiated polyol may be used in polyurethane foam-forming equipment without subsequent treatment and without generating large amounts of solid waste material.

Examples of hydroxy carboxylic acids useful in the practice of the present invention include: lactic acid, salicylic acid, substituted salicylic acids such as 2-hydroxy 3-methyl benzoic acid, 2-hydroxy 4-methyl benzoic acid and combinations of these acids. Lactic acid is particularly preferred.

The neutralized polyether polyol reaction mixture of the present invention is clear, i.e., free from haze and may be used directly in processes for the production of polyurethane foams. Methods for the production of polyurethane foams from such polyether polyols are well known to those in the art.

Generally, a polyether polyol such as that produced in accordance with the present invention is reacted with an organic polyisocyanate in the presence of a blowing agent to produce a polyurethane foam. Organic polyisocyanates which may be reacted with the amine-initiated polyether polyols of the present invention to produce good polyurethane foams include: 2,4-toluene diisocyanate, 2,6-toluene diisocyanate and isomeric mixtures of these diisocyanates; diphenylmethane-4,4'-diisocyanate diisocyanate and polymethylene polyphenyl polyisocyanates; 4,4'-methylene-bis-cyclohexyl diisocyanate; isophorone diisocyanate; and prepolymers of such polyisocyanates.

Blowing agents useful in the production of polyurethane foams from the amine-initiated polyether polyols of the present invention include: water, hydrofluorocarbons such as 1,1-dichloro-1-fluoroethane (HCFC-141b), 1-chloro-1,1-difluoroethane (HCFC-142b), chlorodifluoromethane (HCFC-22), hydrofluorocarbons such as 1,1,1,3,3-pentafluoropropane (HFC-245fe), 1,1,1,2-tetrafluoroethane (HFC-134a), 1,1,1,4,4,4-hexafluorobutane (HFC-356mffm), perfluorinated hydrocarbons such as perfluoropentane or perfluorohexane, hydrocarbons such as isomers of pentane and cyclopentane or mixtures of the above. Water, HCFC-141b, HCFC-22, HFC-245Fa or mixtures thereof are particularly preferred.

Other known auxiliary agents and additives such as catalysts, stabilizers, emulsifiers, fillers, etc. may also optionally be included in foam-forming mixtures containing the polyether polyols of the present invention.

Any of the known methods for producing polyurethane foams may be used to produce foams from the polyether polyols of the present invention. These known methods include the one-shot process, a prepolymer process, or similar process.

Having thus described our invention, the following Examples are given as being illustrative thereof. All of the parts and percentages given in these Examples are parts by weight and percentages by weight, unless otherwise indicated.

EXAMPLES

Example 1

Nine amine-initiated polyether polyols were prepared by the following procedure by using the specified reactants in the amounts indicated in Table 1. The ortho-toluene diamine (o-TDA) was heated at 90° C. for approximately 4 hours at atmospheric pressure. The orthotoluenediamine used was a mixture of primarily 2,3- and 3,4-toluenediamines. A 20 liter reaction vessel was purged with nitrogen and heated to 60° C. The molten o-TDA was charged to the reaction vessel, heated to 115° C. and alkylene oxide ("Epoxide 1"in Table 1) was added. This mixture was held at 115° C. under 30 psig over several hours. For 1 hour if the alkylene oxide was ethylene oxide or three hours if the alkylene oxide was propylene oxide or a combination of propylene oxide and ethylene oxide. 46% potassium hydroxide solution was added to the reaction vessel at atmospheric pressure. Water was removed from the reaction mixture if the hydroxyl number of the product polyether polyol would be less than 300 by heating the reaction mixture to a temperature of 110° C. and pulling a vacuum of less than 5 mm Hg. Additional epoxide ("Epoxide 2" in Table 1) was then added to the reaction vessel and the content were heated at 115° C. under 30 psig for 1 hour if the alkylene oxide was ethylene oxide and for three hours if the alkylene oxide was propylene oxide or a combination of ethylene oxide and propylene oxide. 105% of the theoretical amount of lactic acid (85% solution) necessary to neutralize the KOH catalyst was then added to the reaction mixture. The reaction mixture was then stirred for thirty minutes at 90° C. and atmospheric pressure. The product-containing reaction mixture was then vacuum distilled for 2 hours at 110° C. and less than 5 mm Hg. The vacuum was broken with nitrogen and 0.1% 2,6-di-tert-butyl-4-methylphenol (BHT) was added.

TABLE 1

| Sample | o-TDA (g) | Epoxide 1 (g) | 46% KOH (g) | De-water | Epoxide 2 (g) | 85% Lactic Acid (g) |
|---|---|---|---|---|---|---|
| A | 3,150 | 5,234/PO | 59.9 | no | 5,372/PO | 50.2 |
| B | 1,235 | 1,545/EO | 61.7 | yes | 11,390/PO | 54.4 |
| C | 1,400 | 1,751/EO | 69.9 | yes | 12,889/EO | 61.6 |
| D | 2,681 | 3,376/EO | 50.9 | no | 5,649/EO | 44.9 |
| E | 1,265 | 2,091/PO | 63.1 | yes | 11,138/PO | 55.6 |
| F | 1,680 | 1,200/EO + 1,199/PO | 57.9 | yes | 4,608/EO + 4608/PO | 51.1 |
| G | 1,300 | 2,149/EO | 64.9 | yes | 11,446/EO | 57.2 |
| H | 3,095 | 3,897/EO | 58.9 | no | 6,541/PO | 52.0 |
| I | 2,095 | 3,497/PO | 39.8 | no | 3,572/EO | 35.1 |

PO = Propylene Oxide
EO = Ethylene Oxide

Each of these polyether polyols was clear. The properties of each of these polyols are given in Table 2.

TABLE 2

| Sample | OH Number Theoretical (mg KOH/g) | Epoxide 1 (wt %) | Epoxide 2 (wt %) | OH Number Measured (mg KOH/g) | Viscosity mPa · s at 25° C. |
|---|---|---|---|---|---|
| A | 420 | 49% PO | 51% PO | 392.5 | 134,703 |
| B | 160 | 12% EO | 88% PO | 156.2 | 823 |
| C | 160 | 12% EO | 88% EO | 164.6 | 651 |
| D | 420 | 37% EO | 63% EO | 421.1 | 3,980 |
| E | 160 | 16% PO | 84% PO | 141.3 | 1,161 |
| F | 232 | 10% EO/ 10% PO | 40% EO/ 40% PO | 222.7 | 1,060 |
| G | 160 | 16% PO | 84% EO | 147.5 | 869 |
| H | 420 | 37% EO | 63% PO | 412.4 | 12,128 |
| I | 420 | 49% PO | 51% EO | 399.0 | 25,250 |

Examples 2–4

Three different polyurethane foams were produced from an o-TDA initiated polyether polyol having a functionality of 4, an OH number of 450, a molecular weight of 499 and a viscosity at 25° C. of 15,000 mPa.s and the other materials listed in Table 3 using the amounts indicated in Table 3. In the first foam, the o-TDA was neutralized with sulfuric acid (POLYOL A) and the salts removed by filtration. In the second foam, the o-TDA was neutralized with lactic acid in accordance with the present invention (POLYOL B). In the third foam, the o-TDA was neutralized with oxalic acid (POLYOL C).

TABLE 3

| Example | 2 (Comparative) | 3 | 4 (Comparative) |
|---|---|---|---|
| Polyol A (pbw) | 71.10 | — | — |
| Polyol B (pbw) | — | 71.20 | — |
| Polyol C (pbw) | — | — | 71.10 |
| L-5340[1] (pbw) | 2.00 | 2.00 | 2.00 |
| Desmorapid PV[2] (pbw) | 0.90 | 0.80 | 0.90 |
| H$_2$O (pbw) | 1.00 | 1.00 | 1.00 |
| HCFC-141[3] (pbw) | 25.00 | 25.00 | 25.00 |
| Isocyanate[4] (pbw) | 98.90 | 98.90 | 98.90 |
| OH/Index[5] | 460/110 | 460/110 | 460/110 |
| Friability (5 min) | slight | slight | slight |
| Shrinkage | none | none | none |
| Core Density | 1.69 | 1.70 | 1.65 |

TABLE 3-continued

| Example | 2 (Comparative) | 3 | 4 (Comparative) |
|---|---|---|---|
| (lb/ft$^3$) | | | |
| K-factor (Btu-in./hr./ft$^2$°F.) | 0.116 | 0.117 | 0.117 |
| % Thickness Increase | 2.5% | 1.0% | 2.5% |

[1] L-5340 is a silicone surfactant which is commercially available from Union Carbide.
[2] Desmorapid PV is a catalyst used in the production of polyurethane foams which is commercially available from Rhein Chemie.
[3] HCFC-141b is 1,1-dichloro-1-fluoroethane.
[4] Isocyanate is a polymeric diphenylmethane diisocyanate having an NCO content of 31.5% which is commercially available from Bayer Corporation under the name Mondur MR.
[5] OH/Index = OH Number/Isocyanate Index.

The improved demold characteristics of the polyether polyols of the present invention were determined in the following manner.

A 25"×13"×2" mold was heated to 50° C. The polyol plus additives which had been cooled to 15° C. was mixed with isocyanate (also at 15° C.) for 5 seconds and the appropriate amount of mixture was poured into the open mold. The minimum fill density was then determined in accordance with the standard procedure.

The amount of polyol/isocyanate mixture necessary to give a 10% excess over the minimum fill density was then poured into the empty mold and the mold was closed. After 3 minutes the mold was opened and the foam was allowed to stand for an additional 7 minutes. The center of the foam panel was measured and the % thickness increase was calculated.

The thus determined thickness increase is a good measure of how much the foam expands after demolding. Foams having a low % thickness increase can be removed from a mold or fixture in much shorter periods of time than foams having higher % thickness increases. This shorter time before removal is important in applications such as the manufacture of appliances.

As can be seen from Table 3, the foam produced from the polyether polyol of the present invention had a substantially lower % thickness increase than either of the comparative foams.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A process for the production of a clear amine-initiated polyether polyol by
    a) epoxidizing an amine in the presence of an alkali metal hydroxide catalyst and
    b) upon completion of epoxidation, adding a hydroxy-carboxylic acid to the epoxidized mixture in an amount sufficient to neutralize any remaining alkali metal hydroxide.

2. The process of claim 1 in which the amine is o-toluene diamine.

3. The process of claim 2 in which the alkali metal hydroxide is potassium hydroxide.

4. The process of claim 3 in which the hydroxy-carboxylic acid is lactic acid.

5. The process of claim 2 in which the hydroxy-carboxylic acid is lactic acid.

6. The process of claim 1 in which the hydroxy-carboxylic acid is lactic acid.

7. The process of claim 1 in which the alkali metal hydroxide is selected from the group consisting of sodium hydroxide, potassium hydroxide and lithium hydroxide.

8. The process of claim 1 in which the amine is any of the isomers of toluene diamine or an isomeric mixture of toluene diamine.

9. The process of claim 1 in which the hydroxy-carboxylic acid is selected from the group consisting of lactic acid, salicylic acid, substituted salicylic acids and mixtures thereof.

10. The clear polyether polyol produced by the process of claim 1.

11. The polyether polyol produced by the process of claim 4.

12. A process for the production of a foam comprising reacting an organic polyisocyanate with the polyether polyol of claim 10.

13. A process for the production of a foam comprising reacting an organic polyisocyanate with the polyether polyol of claim 11.

* * * * *